United States Patent
Strehlau et al.

(10) Patent No.: US 6,216,449 B1
(45) Date of Patent: Apr. 17, 2001

(54) PROCESS FOR EVALUATING PERFORMANCE DETERIORATION OF A NITROGEN OXIDE STORAGE CATALYST

(75) Inventors: Wolfgang Strehlau, Grosskrotzenburg; Lothar Mussmann, Offenbach; Ulrich Göbel, Hattersheim, all of (DE)

(73) Assignee: Degussa AG, Frankfurt am Main (DE)

( * ) Notice: Subject to any disclaimer, the term of this patent is extended or adjusted under 35 U.S.C. 154(b) by 0 days.

(21) Appl. No.: 09/288,075

(22) Filed: Apr. 8, 1999

(30) Foreign Application Priority Data

Apr. 14, 1998 (DE) .............................. 198 16 175

(51) Int. Cl.$^7$ ...................................... F01N 3/00
(52) U.S. Cl. .................. 60/274; 60/276; 60/285
(58) Field of Search .................. 60/274, 276, 277, 60/285, 286, 303; 73/118.1

(56) References Cited

U.S. PATENT DOCUMENTS

| | | | |
|---|---|---|---|
| 5,526,641 | * | 6/1996 | Sekar et al. .......................... 60/274 |
| 5,609,022 | * | 3/1997 | Cho ....................................... 60/274 |
| 5,693,877 | | 12/1997 | Minoru et al. . |
| 5,715,677 | * | 2/1998 | Wallman et al. .................... 60/274 |
| 5,743,084 | * | 4/1998 | Hepburn ............................... 60/274 |
| 5,771,685 | * | 6/1998 | Hepburn ............................... 60/274 |
| 5,809,774 | * | 9/1998 | Peter-Hoblyn et al. ........... 60/274 |
| 5,813,224 | * | 9/1998 | Rao et al. ............................ 60/274 |
| 5,832,722 | * | 11/1998 | Cullen et al. ....................... 60/274 |
| 5,890,359 | * | 4/1999 | Enander ............................... 60/274 |
| 5,894,725 | * | 4/1999 | Cullen et al. ....................... 60/274 |
| 5,924,280 | * | 7/1999 | Tarabulski .......................... 60/274 |
| 6,055,808 | * | 5/2000 | Poola et al. ........................ 60/274 |

FOREIGN PATENT DOCUMENTS

| | | |
|---|---|---|
| 19536798 | 4/1996 | (DE) . |
| 0690213 | 1/1996 | (EP) . |
| 0733786 | 9/1996 | (EP) . |
| 0735250 | 10/1996 | (EP) . |

\* cited by examiner

*Primary Examiner*—John A. Jeffery
*Assistant Examiner*—Fadi H. Dahbour
(74) *Attorney, Agent, or Firm*—Smith, Gambrell & Russell, LLP

(57) ABSTRACT

A process for evaluating performance deterioration of a nitrogen oxide storage catalyst which has a nitrogen oxide storage function and an oxygen storage function and is operated with cyclic alternation of the air/fuel ratio in the exhaust gas from lean to rich. The nitrogen oxides are stored during the lean phase and the nitrogen oxides are desorbed and converted during the rich phase. To check the serviceability of the storage catalyst, the air/fuel ratio of the exhaust gas is switched from lean to rich and the rich phase is extended beyond the time required for complete desorption of the nitrogen oxides until at least the rich exhaust gas passes right through the catalyst and the time interval $\Delta t_1$ produced between the first change-over until breakthrough of the rich exhaust gas and, after again switching from rich to lean running, the time interval $\Delta t_2$ produced between the second change-over and passage of oxygen through the catalyst are measured and the time differences $\Delta t_1$ and $\Delta t_2$ are used for separate assessment of the oxygen storage function and the nitrogen oxide storage function of the catalyst.

10 Claims, 2 Drawing Sheets

PROCESS FOR EVALUATING PERFORMANCE DETERIORATION OF A NITROGEN OXIDE STORAGE CATALYST

INTRODUCTION AND BACKGROUND

The present invention relates to a process for evaluating performance deterioration of a nitrogen oxide storage catalyst which has a nitrogen oxide storage function and an oxygen storage function and is operated with cyclic alternation of the standardized air/fuel ratios in the exhaust gas from air/fuel ratios of greater than 1 (sorption phase) to store the nitrogen oxides to standardized air/fuel ratios of less than 1 (desorption phase) to desorb and convert the nitrogen oxides.

Nitrogen oxide storage catalysts were developed specifically for the treatment of exhaust gases from lean operating internal combustion engines. Lean operating gasoline engines, so-called lean-burn engines and diesel engines belong to the group of lean operating internal combustion engines. Lean-burn engines, in particular with direct injection of gasoline, are being increasingly used in the vehicle construction sector since they enable theoretical fuel savings of up to 25% as compared with stoichiometrically operated internal combustion engines.

Nitrogen oxide storage catalysts have the ability to store nitrogen oxides over a wide temperature range under oxidizing exhaust gas conditions, that is to say under lean conditions. This operation mode is therefore also called the sorption phase in the following.

Since the storage capacity of a storage catalyst is limited, it has to be regenerated from time to time. For this purpose, the standardized air/fuel ratio of the air/fuel mixture supplied to the engine and thus also the standardised air/fuel ratio of the exhaust gas leaving the engine is lowered to values below 1 for short periods. This is also called enrichment of the air/fuel mixture or the exhaust gas. Therefore reducing conditions prevail in the exhaust gas upstream of the entrance to the storage catalyst during this short enrichment phase.

Under the reducing conditions during the enrichment phase, the stored nitrogen oxides are released and reduced to nitrogen on the storage catalyst, with simultaneous oxidation of carbon monoxide, hydrocarbons and hydrogen in the same way as in conventional three-way catalysts. This operation mode of the storage catalyst is also called the desorption and conversion phase in the following. With correct functioning of the overall system of storage catalyst, oxygen sensors and engine electronics system, approximately stoichiometric conditions prevail downstream of the storage catalyst during the desorption phase, that is to say the hydrocarbons and carbon monoxide present in excess upstream of the storage catalyst during the desorption phase are oxidized on the storage catalyst by the released nitrogen oxides.

The duration of the sorption phase typically lasts about 30 to 100 seconds. The duration of the desorption phase is substantially shorter and is within the range of less than only a few seconds (1 to 10 seconds).

The mode of operation and composition of nitrogen oxide storage catalysts are disclosed, for example, in EP 0 560 991 B1. These catalysts contain at least one component from the group of alkali metals (potassium, sodium, lithium, cesium), alkaline earth metals (barium, calcium) or rare earth metals (lanthanum, yttrium) as storage components. The storage catalyst contains platinum as a catalytically active element. Under oxidizing exhaust gas conditions, that is under lean operation, the storage components store the nitrogen oxides contained in the exhaust gas in the form of nitrates. For this to occur, however, the nitrogen oxides, about 50 to 90% of which are present as nitrogen monoxide, depending on the construction of the engine and its mode of operation, first have to be oxidised to nitrogen dioxide. This takes place on the platinum component in the storage catalyst.

In addition to the components mentioned above, the nitrogen oxide storage catalyst also contains oxygen storing components. In this case it can take on the functions of a conventional three-way converter catalyst in addition to storing nitrogen oxides. Cerium oxide is used for the most part as an oxygen storing component. The nitrogen oxide storage catalyst then also has an oxygen storage function in addition to its nitrogen oxide storage function and thus it is bifunctional.

An important problem with modern exhaust gas treatment process is evaluating performance deterioration of the catalysts used in order to facilitate exchanging catalysts which are not working properly anymore. This also applies to nitrogen oxide storage catalysts, the nitrogen oxide storage capacity of which can be damaged on the one hand by sulfur present in the fuel and on the other hand by thermal stresses. Whereas poisoning due to sulfur can generally be reversed at elevated temperatures, thermal damage is an irreversible process.

With bifunctional storage catalysts, in principle both storage functions can be damaged by poisoning and by thermal effects. Damage to one function, however, does not necessarily imply damage to the other function.

Since nitrogen oxides and oxygen are both oxidizing components, their effects cannot be clearly separated from each other, so wrong diagnoses may be made when checking the catalyst. Therefore, there is a fundamental need to be able to assess the proper functioning of the two storage functions independently of each other.

EP 0 690 213 A1 describes an exhaust gas treatment device which is able to determine the degree of damage to a nitrogen oxide storage catalyst or to a three-way converter catalyst. For this, an oxygen sensor, the output signal from which is proportional to the air/fuel ratio of the exhaust gas, is arranged downstream of the nitrogen oxide storage catalyst or three-way converter catalyst. To determine the damage to a nitrogen oxide storage catalyst or three-way converter catalyst, from time to time the air/fuel ratio in the fuel mixture is altered from lean to rich or from rich to lean. During the operating period with an altered air/fuel ratio, the damage already caused to the catalyst is determined from the peak value of the output signal from the oxygen sensor.

A process for checking a bifunctional nitrogen oxide storage catalyst is not disclosed in the document mentioned above. Therefore, an object of the present invention is to provide a process for evaluating the performance deterioration of bifunctional storage catalysts which enables the two storage functions to be checked separately.

SUMMARY OF THE INVENTION

The above and other objects of the invention can be achieved by a process for checking the proper functioning of a nitrogen oxide storage catalyst which has a nitrogen oxide storage function and an oxygen storage function and is operated with cyclic alternation of the air/fuel ratio in the exhaust gas from lean to rich and back, wherein the nitrogen oxides are stored during the lean phase and the nitrogen oxides are desorbed and converted during the rich phase.

It is a feature of the invention to check the proper performance of the storage catalyst by switching the air/fuel ratio of the exhaust gas from lean to rich and extending the rich phase beyond the time required for complete desorption of the nitrogen oxides until at least the rich exhaust gas passes right through the catalyst.

It is a further feature of the invention that the time interval $\Delta t_1$ produced between the first switch-over until breakthrough of the rich exhaust gas and, after again switching from rich to lean running, the time interval $\Delta t_2$ produced between the second switch-over and passage of oxygen through the catalyst are measured and the time differences $\Delta t_1$ and $\Delta t_2$ are used for separate assessment of the oxygen storage function and the nitrogen oxide storage function of the catalyst.

According to the invention, therefore, the two storage functions of the bifunctional catalyst are checked by measuring the time differences between changes in the air/fuel ratio upstream and downstream of the storage catalyst. Whereas the time difference when switching the air/fuel ratio from lean to rich is caused by the combined effects of the nitrogen oxide and oxygen storage functions of the catalyst, the time difference when switching the air/fuel ratio from rich to lean depends only on the oxygen storage capacity of the catalyst.

After switching the air/fuel ratio from lean to rich, the nitrogen oxides are desorbed by the reductive components in the exhaust gas (hydrocarbons and carbon monoxide) and are converted on the storage catalyst. In addition, the reductive components in the exhaust gas are oxidized, by consumption of the stored oxygen. The nitrogen oxide storage components and the oxygen storage components are thus both emptied in the presence of rich exhaust gas.

The air/fuel ratio of the exhaust gas downstream of the catalyst does not spontaneously follow the change in air/fuel ratio upstream of the catalyst, but only after a certain delay, and remains in the lean region as long as the storage components have not been emptied so that a two-point lambda sensor located downstream of the catalyst would still detect a lean exhaust gas composition. Only when the nitrogen oxide storage components and the oxygen storage components have been emptied are hydrocarbons and carbon monoxide no longer converted. Then these substances pass through the catalyst and the air/fuel ratio downstream of the catalyst changes over to the rich region. This time can be determined in a simple manner with a so-called two-point lambda sensor, the signal from which suddenly changes from lean to rich, or vice versa, over a narrow air/fuel ratio interval at round about 1. However, it is also possible to use a linear lambda sensor to determine this time. The mode of operation of lambda sensors suitable for the process are described in "Kraftfahrttechnisches Taschenbuch" from Bosch, VDI-Verlag, 20th edition 1995, pages 490 to 492.

The stored nitrogen oxides are generally released more rapidly than the oxygen stored on the catalyst is consumed by the hydrocarbons in the rich exhaust gas, or is depleted. In addition, these desorption rates also depend on the degree of enrichment of the exhaust gas and the exhaust gas temperature. The more the exhaust gas is enriched, the more rapidly are the nitrogen oxide storage components and oxygen storage components emptied. The same applies to raising the exhaust gas temperature. For the process according to the invention, the standardized air/fuel ratio may be fixed within an interval between 0.7 and 0.99 during the rich phase.

If a standardized air/fuel ratio of just under 1 is chosen, then emptying the storage components takes place more slowly than with a lower value for the standardized air/fuel ratio. This enables greater accuracy when measuring the time. Passage of the reductive components through the catalyst occurs in this case only after complete emptying of the nitrogen oxide storage components and the oxygen storage components, so that the time difference $\Delta t_1$ being measured gives the sum of the two storage capacities. In the event of greater enrichment, after rapid emptying of the nitrogen oxide storage components, there is a surplus of reductive components which cannot be converted rapidly enough by the stored oxygen. This leads to passage of the reductive components through the catalyst before the oxygen storage components have been completely emptied. In this case the time difference being measured is composed of the storage capacity for nitrogen oxides and some of the storage capacity for oxygen.

Checking the catalyst is preferably performed with a specific operating condition for the engine, that is with a defined exhaust gas temperature and standardized air/fuel ratio during the rich phase. A fixed value is selected for the duration of the rich phase, this being greater by a factor of 1.0 to 10 than the time interval measured up to the first passage of rich exhaust gas through the catalyst under the selected operating conditions in the case of a fresh storage catalyst. The defined operating conditions during the catalyst checking procedure guarantees that the same fraction of the oxygen storage capacity in the catalyst is always included in the test.

The factor mentioned above is preferable selected so that the part of the oxygen store emptied by the reductive components in this time corresponds exactly to the value which is required for trouble-free testing of the catalyst.

Emptying of the nitrogen oxide and oxygen stores when switching the air/fuel ratio from lean to rich can be compared with the corresponding filling of the oxygen store after completion of the rich phase. In the same way as when switching from lean to rich, then also after switching from rich to lean the air/fuel ratio downstream of the catalyst does not spontaneously follow the air/fuel ratio upstream of the catalyst. The air/fuel ratio initially remains in the rich region since the oxygen excess in the lean exhaust gas is now used first for filling up the oxygen store. Furthermore, a two-point lambda sensor located downstream of the catalyst would thus also indicate a rich exhaust gas. Only after the oxygen storage components have been filled is there a noticeable passage of oxygen through the catalyst and thus, in the case of measurements made with a two-point sensor, is there a detectable change in the exhaust gas composition. The time difference $\Delta t_2$ measured between the end of the rich phase and passage of oxygen through the catalyst is a measure of the part of the oxygen storage capacity included in the test. If the oxygen storage capacity of the catalyst drops below this amount due to poisoning with sulfur or due to thermal damage, then this is manifested by a reduction in $\Delta t_2$ and it may optionally trigger a signal to change the catalyst.

The equations given below for $\Delta t_1$ and $\Delta t_2$ may be used for separate assessment of the nitrogen oxide storage function and the oxygen storage function:

$$\Delta t_1 = a \Delta K_{NOx} + b \times K_{O2} \qquad (i)$$

In this equation, a and b are proportionality constants. $K_{NOx}$ and $K_{O2}$ are the storage capacities of the catalyst for nitrogen oxides and oxygen.

Equation (i) reflects the finding that $\Delta t_1$ depends on both storage capacities. It is apparent that the effect of the two storage capacities cannot be separated from each other by measuring $\Delta t_1$ alone. Therefore the determination of $\Delta t_2$ is used as a further measurement. $\Delta t_2$ depends only on the oxygen storage capacity:

$$\Delta t_2 = c \times K_{O2} \qquad (ii)$$

The proportionality constant b describes the rate of emptying of the oxygen storage components, whereas the constant c is a measure of the rate at which the oxygen storage components are refilled. From equations (i) and (ii), the capacity of the nitrogen oxide storage components is given as:

$$a \times K_{NOx} = \Delta t_1 + (b/c) \times \Delta t_2 \qquad (iii)$$

The ratio b/c in equation (iii) depends on the material and the operating conditions selected for the engine during catalyst testing. It can be determined in preliminary trials. Equations (ii) and (iii), even with the simultaneous presence of a nitrogen oxide storage function and an oxygen storage function in the storage catalyst, thus enable separate assessment of the two functions by measuring $\Delta t_1$ and $\Delta t_2$.

The time differences $\Delta t_1$ and $\Delta t_2$ can be determined in a number of different ways. Thus, there is the possibility of determining the time differences $\Delta t_1$ and $\Delta t_2$ from the difference in the respective time the control system in the engine switches the air/fuel ratio and the respective time the air/fuel ratio downstream of the catalyst changes, measured with a two-point lambda sensor or a linear lambda sensor. If there is a long exhaust gas pipe between the engine and the storage catalyst, the time differences measured in this way must optionally be corrected for the time for the exhaust gas to pass from the engine to the catalyst. Alternatively, the changes in air/fuel ratio upstream and downstream of the catalyst may each be detected with a two-point lambda sensor, in order to determine the time differences.

BRIEF DESCRIPTION OF DRAWINGS

The present will be further understood with reference to the accompanying drawings, wherein.

DETAILED DESCRIPTION OF INVENTION

Figure 1:
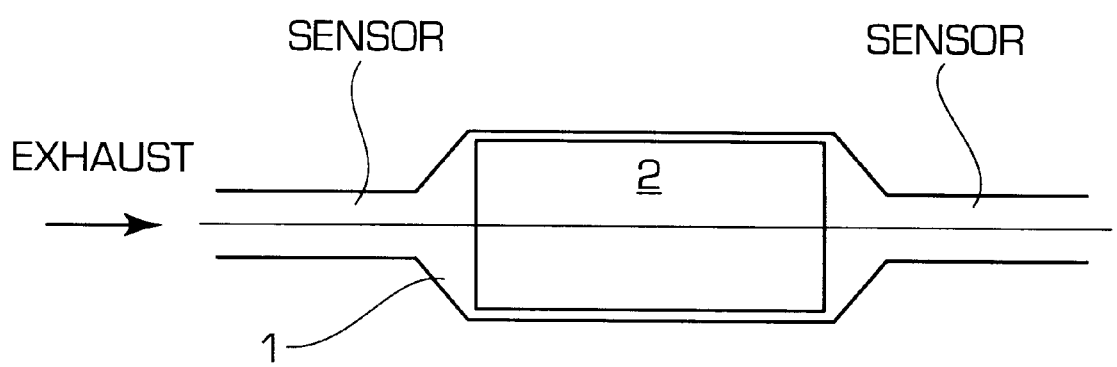
FIG. 1 schematic representation of an exhaust gas treatment unit with a two-point lambda sensor upstream and downstream of the storage catalyst.

FIG. 1 schematically shows the layout of an exhaust gas treatment unit (1) such as is suitable for performing the process according to the invention. (2) designates the storage catalyst, the function of which it is intended to check regularly. This is built into a housing in the exhaust gas treatment unit. An oxygen sensor (sensor 1) is introduced into the exhaust gas pipe upstream of the catalyst, with respect to the direction of flow of the exhaust gas. Downstream of the nitrogen oxide storage catalyst is located a second oxygen sensor (sensor 2). In this example both sensors are two-point lambda sensors.

Figure 2:
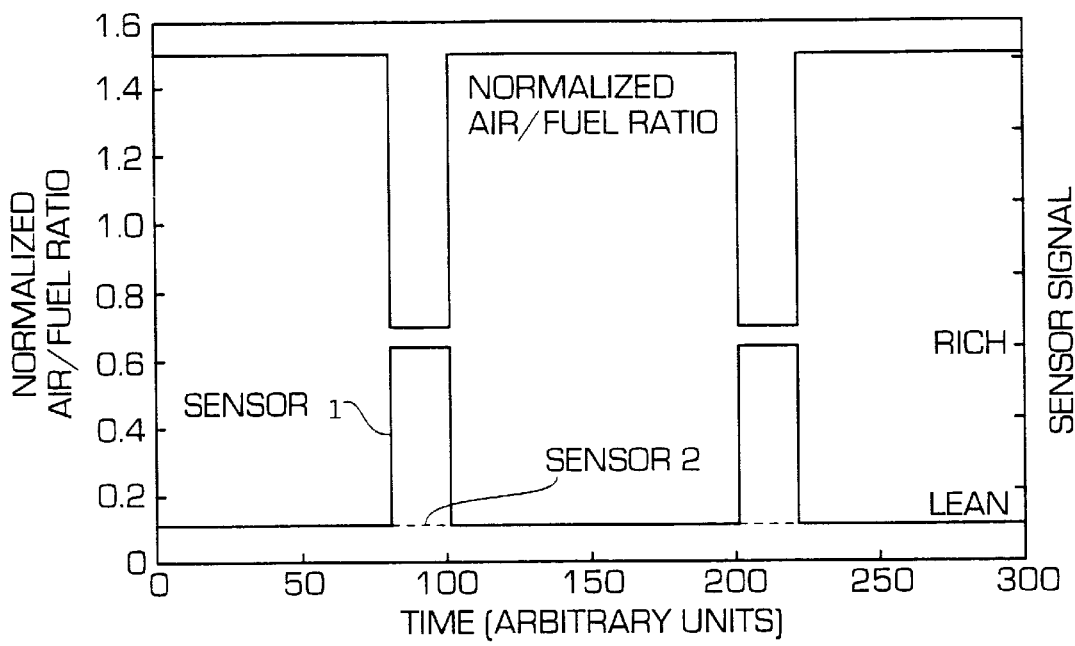
FIG. 2 is a representation of the change with time of the standardized air/fuel ratio λ imposed upstream of the storage catalyst and the change in signal from two two-point lambda sensors under normal operation of a lean-burn engine.

FIG. 2 shows the change in standardized air/fuel ratio imposed by the engine electronics system (not shown), upstream of the storage catalyst, and the signals from sensor 1 upstream of the catalyst and from sensor 2 downstream of the catalyst. The signal from sensor 1 follows the change in air/fuel ratio predetermined by the engine electronics system, while the signal from sensor 2 is substantially affected by the storage properties of the catalyst.

The air/fuel ratio has a value greater than 1 (here 1.5) during most of the operating period. In this lean operating phase, nitrogen oxides are stored on the catalyst by the nitrogen oxide storage function of the catalyst and oxygen is stored by the oxygen storage function of the catalyst.

After a certain time the nitrogen oxide storage capacity in the catalyst is filled up and it has to be regenerated. For this, the air/fuel ratio is lowered to a value of less than 1 (here 0.7) by the engine electronics system. accordingly, the sensor signal upstream of the catalyst changes correspondingly. Due to the now reducing exhaust gas, the nitrogen oxides stored on the storage catalyst are decomposed and desorbed and the oxygen stored on the catalyst is consumed in oxidizing the reductive constituents of the exhaust gas. In the event of optimum adjustment of this process, the exhaust gas leaving the catalyst has an approximately stoichiometric composition. Sensor 2 therefore indicates no change in its sensor signal.

During normal operation of the storage catalyst, a reduction in the air/fuel ratio by the engine electronics system terminates when the storage catalyst has been fully regenerated. The sensor signal for sensor 1 changes in accordance with this change, while sensor 2 in the ideal case shows no change over the entire operating cycle. Actually, however, minor changes in the signal from sensor 2 may occur if the desorption process is continued for longer than is required. These conditions, however, should be avoided as far as possible during normal operation of the storage catalyst since too long a desorption process leads to an increased consumption of fuel.

Figure 3:
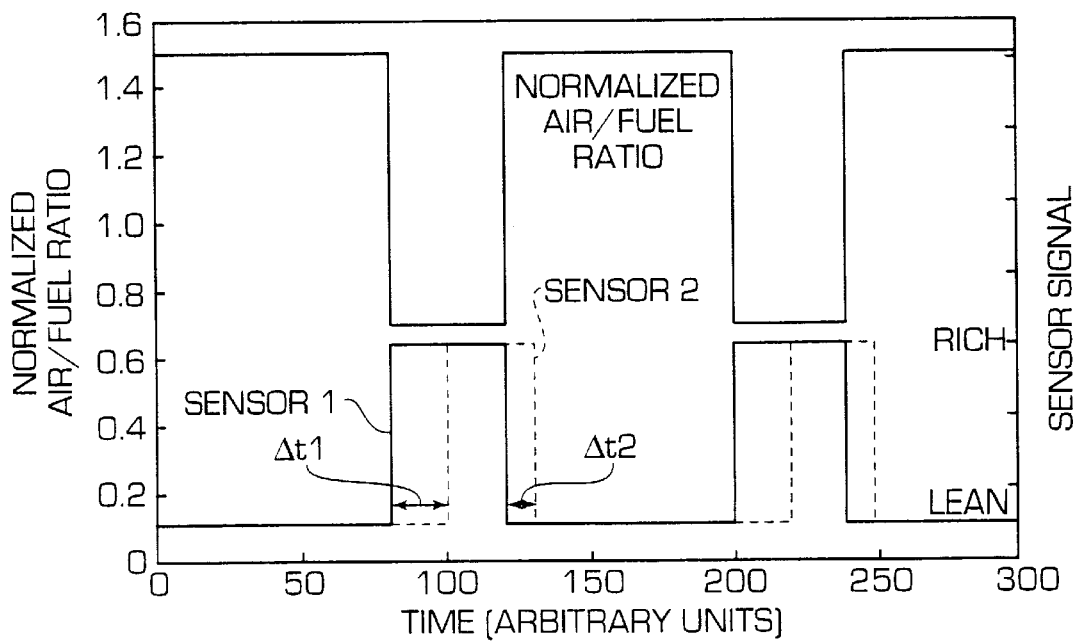
FIG. 3 is a representation of the change with time of the standardized air/fuel ratio λ imposed upstream of the storage catalyst and the change in signal from two two-point lambda sensors during checking of the catalyst function.

From time to time, the correct performance of the storage catalyst has to be checked by the engine electronics system. The mode of operation according to the invention is shown in FIG. 3. During checking of the storage catalyst, the air/fuel ratio is held at a value of less than 1 for longer than is required for the pure desorption process. The rich phase has a fixed duration, which is longer than the time required for the reductive components to pass right through the catalyst in the case of a fresh catalyst. Then passage of the reductive components through the catalyst occurs during the rich phase and this leads to a corresponding change in signal from sensor 2.

The period of time $\Delta t_1$ which elapses up to recording of the reductive components by sensor 2, is given by the amount of stored nitrogen oxides on the storage catalyst and the proportion of the oxygen storage components included in the test.

After conclusion of the rich-mix phase, the air/fuel ratio is again raised to a value greater than 1. Sensor 2, however, still indicates a less than stoichiometric air/fuel ratio downstream of the catalyst for a certain time $\Delta t_2$, since the oxygen in the lean-mix exhaust gas is initially used to refill the oxygen store in the catalyst before it can pass unhindered through the catalyst and the signal from sensor 2 returns to its starting value.

As demonstrated by this explanation, the time interval $\Delta t_2$ depends only on the oxygen storage capacity of the catalyst. By measuring this time, therefore, an assessment of the condition of the oxygen storage function of the catalyst can be made. The smaller $\Delta t_2$, the smaller is the oxygen storage capacity of the catalyst still remaining.

To improve the actual results, the test phase is repeated over several nitrogen oxide storage cycles before switching the engine electronics system back to normal storage operation.

Further variations and modifications will be apparent to those skilled in the art from the foregoing and are intended to be encompassed by the claims appended hereto.

German priority application 198 16 175.1 is relied on and incorporated herein by reference.

What is claimed is:

1. A process for assessing performance of a bifunctional nitrogen oxide storage catalyst placed in an exhaust gas stream, which bifunctional catalyst stores both nitrogen oxide and oxygen, the process comprising:
    a) exposing the catalyst to an exhaust gas stream in an initial lean phase resulting from a lean air/fuel ratio, during which nitrogen oxides are stored;
    b) afterward exposing the catalyst to an exhaust gas stream in a rich phase resulting from a rich air/fuel ratio, during which nitrogen oxides are desorbed and converted, wherein the rich phase extends beyond a time required for complete desorption of the nitrogen oxides and until at least a portion of rich exhaust gas breaks through the catalyst;
    c) measuring a time interval $\Delta t_1$ from a beginning of the rich phase until the breakthrough of rich exhaust gas through the catalyst;
    d) afterward exposing the nitrogen oxide storage catalyst to an exhaust gas stream in a lean phase resulting from a lean air/fuel ratio, during which nitrogen oxides are stored, wherein the lean phase extends at least until a portion of oxygen in the exhaust gas breaks through the catalyst;
    e) measuring a time interval $\Delta t_2$ from a beginning of the lean phase until the breakthrough of at least a portion of oxygen through the catalyst;
    f) optionally repeating steps b) through e) over several cycles; and
    g) separately assessing the oxygen storage function of the catalyst, and the nitrogen oxide storage function of the catalyst, based on the measured time intervals $\Delta t_1$ and $\Delta t_2$.

2. The process according to claim 1, wherein the rich phase is extended by a factor of 1 to 10 times an estimated time for a portion of rich exhaust gas to break through a fresh catalyst.

3. The process according to claim 2, wherein a standardized air/fuel ratio during the rich phase is from 0.99 to 0.7.

4. The process according to claim 3, wherein the time difference $\Delta t_1$ is measured from the time the initial lean phase ends, measured upstream of the catalyst with a two-point lambda sensor or a linear lambda sensor, to the time the rich exhaust gas breaks through the catalyst, measured downstream of the catalyst with a two-point lambda sensor or a linear lambda sensor.

5. The process according to claim 3, wherein the time difference $\Delta t_2$ is measured from the time the rich phase ends, as measured upstream of the catalyst with a two-point lambda sensor or a linear lambda sensor, to the time oxygen breaks through the catalyst, as measured downstream of the catalyst with a two-point lambda sensor or a linear lambda sensor.

6. The process according to claim 3, wherein the breakthrough of rich exhaust gas through the catalyst during the rich phase, and the breakthrough of oxygen through the catalyst during the lean phase, are determined based on changes in the air/fuel ratio downstream of the catalyst using a two-point lambda sensor.

7. The process according to claim 1, wherein the time difference $\Delta t_1$ is a function of both the nitrogen oxide storage capacity of the catalyst and the oxygen storage capacity of the catalyst.

8. The process according to claim 6, wherein the time difference $\Delta t_2$ is a function of the oxygen storage capacity of the catalyst.

9. The process according to claim 1, wherein a standardized air/fuel ratio during the rich phase is selected so that the time difference $\Delta t_1$ is a function of both the nitrogen oxide storage capacity of the catalyst and the oxygen storage capacity of the catalyst.

10. The process according to claim 9, wherein the standardized air/fuel ratio during the rich phase is just under 1.

* * * * *